US00RE42647E

(19) United States
(12) Reissued Patent
Lee et al.

(10) Patent Number: US RE42,647 E
(45) Date of Reissued Patent: Aug. 23, 2011

(54) TEXT-TO SPEECH CONVERSION SYSTEM FOR SYNCHRONIZING BETWEEN SYNTHESIZED SPEECH AND A MOVING PICTURE IN A MULTIMEDIA ENVIRONMENT AND A METHOD OF THE SAME

(75) Inventors: Jung Chul Lee, Daejon-Shi (KR); Min Soo Hahn, Daejon-Shi (KR); Hang Seop Lee, Daejon-Shi (KR); Jae Woo Yang, Daejon-Shi (KR); Youngjik Lee, Daejon-Shi (KR)

(73) Assignee: Electronics and Telecommunications Research Institute, Daejon (KR)

(21) Appl. No.: 10/193,594

(22) Filed: Sep. 30, 2002

Related U.S. Patent Documents

Reissue of:
(64) Patent No.: 6,088,673
Issued: Jul. 11, 2000
Appl. No.: 09/020,712
Filed: Feb. 9, 1998

(30) Foreign Application Priority Data

May 8, 1997 (KR) ..... 97-17615

(51) Int. Cl.
*G10L 13/08* (2006.01)

(52) U.S. Cl. ..... 704/260; 704/275; 704/276; 704/278; 715/727

(58) Field of Classification Search ..... 704/270–278, 704/260, 235, 258, 257, 220, 266, 267; 715/500.1, 715/515, 727; 705/17; 345/716, 302; 352/50; 379/93.17; 707/515
See application file for complete search history.

(56) References Cited

U.S. PATENT DOCUMENTS

| | | | | |
|---|---|---|---|---|
| 4,260,229 | A * | 4/1981 | Bloomstein | 352/50 |
| 4,305,131 | A * | 12/1981 | Best | 345/716 |
| 5,111,409 | A * | 5/1992 | Gasper et al. | 715/500.1 |
| 5,313,522 | A * | 5/1994 | Slager | 704/276 |
| 5,386,581 | A * | 1/1995 | Suzuki et al. | 715/515 |
| 5,500,919 | A * | 3/1996 | Luther | 704/260 |
| 5,557,661 | A * | 9/1996 | Yokoyama | 379/93.17 |
| 5,608,839 | A | 3/1997 | Chen | 395/2.44 |
| 5,615,300 | A * | 3/1997 | Hara et al. | 704/260 |
| 5,630,017 | A | 5/1997 | Gasper et al. | |

(Continued)

FOREIGN PATENT DOCUMENTS

AT E 72 083 B 11/1986

(Continued)

OTHER PUBLICATIONS

Nakumura et al. "Speech Recognition and Lip Movement Synthesis"; HMM based Audio-Visual Integration; pp. 93-98.

(Continued)

*Primary Examiner* — Vijay B Chawan
(74) *Attorney, Agent, or Firm* — Cohen Pontani Lieberman & Pavane LLP

(57) ABSTRACT

The present invention provides a text-to-speech conversion system (TTS) for [interlocking] *synchronizing* with multimedia and a method for organizing input data of the TTS which can enhance the [natural] *naturalness* of synthesized speech and accomplish the synchronization of multimedia with TTS by defining additional prosody information, the information required to [interlock] *synchronize* TTS with multimedia, and interface between [these] *this* information and TTS for use in the production of the synthesized speech.

32 Claims, 2 Drawing Sheets

U.S. PATENT DOCUMENTS

| | | | | | |
|---|---|---|---|---|---|
| 5,636,325 | A | * | 6/1997 | Farrett | 704/258 |
| 5,657,426 | A | * | 8/1997 | Waters et al. | 704/276 |
| 5,677,739 | A | | 10/1997 | Kirkland | |
| 5,677,993 | A | * | 10/1997 | Ohga et al. | 704/257 |
| 5,689,618 | A | | 11/1997 | Gasper et al. | |
| 5,729,694 | A | * | 3/1998 | Holzrichter et al. | 705/17 |
| 5,751,906 | A | * | 5/1998 | Silverman | 704/260 |
| 5,774,854 | A | * | 6/1998 | Sharman | 704/260 |
| 5,777,612 | A | * | 7/1998 | Kataoka | 715/500.1 |
| 5,850,629 | A | * | 12/1998 | Holm et al. | 704/260 |
| 5,860,064 | A | * | 1/1999 | Henton | 704/260 |
| 5,970,459 | A | * | 10/1999 | Yang et al. | 704/276 |

FOREIGN PATENT DOCUMENTS

| | | | |
|---|---|---|---|
| DE | 41 01 022 | A1 | 1/1991 |
| EP | 0 225 729 | B1 | 6/1987 |
| EP | 0 689 362 | A2 | 12/1995 |
| EP | 0 706 170 | A2 | 4/1996 |
| GB | 2231246 | | 11/1990 |
| JP | 02 234285 | | 9/1990 |
| JP | 2234285 | | 11/1990 |
| JP | 03 241399 | | 10/1991 |
| JP | 04 285769 | | 10/1992 |
| JP | 04 359299 | | 12/1992 |
| JP | 4359299 | | 12/1992 |
| JP | 05 064171 | | 3/1993 |
| JP | 05 188985 | | 7/1993 |
| JP | 05-313686 | | 11/1993 |
| JP | 05 313686 | | 11/1993 |
| JP | 5313686 | | 11/1993 |
| JP | 06 326967 | | 11/1994 |
| JP | 06 348811 | | 12/1994 |
| JP | 6348811 | | 12/1994 |
| JP | 07 038857 | | 2/1995 |
| JP | 07-306692 | | 11/1995 |
| JP | 08-030287 | | 2/1996 |
| WO | WO 85/04747 | | 10/1985 |

OTHER PUBLICATIONS

Yamamoto et al. pp. 245-246 Nara Institute of Science and Technology.

Nakumura et al. "Speech Recognition and Lip Movement Synthesis"; HMM based Audio-Visual Integration; pp. 93-98, 1997.

Yamamoto et al. pp. 245-246 Nara Institute of Science and Technology Sep. 1997.

* cited by examiner

TEXT-TO SPEECH CONVERSION SYSTEM FOR SYNCHRONIZING BETWEEN SYNTHESIZED SPEECH AND A MOVING PICTURE IN A MULTIMEDIA ENVIRONMENT AND A METHOD OF THE SAME

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to [a] text-to-speech conversion systems (hereinafter, referred to as TTS) for [interlocking with multimedia] *synchronizing synthesized speech and a moving picture* and a method [for organizing input data] of the same, and more particularly to a [text-to-speech conversion system (] TTS [)] for [interlocking with multimedia] *synchronizing synthesized speech and a moving picture* and a method [for organizing input data] of the same for enhancing the [natural] *naturalness* of *the* synthesized speech [and accomplishing synchronization between multimedia and TTS by defining additional prosody information, the information required to interlock TTS with multimedia, and interface between these information and TTS for use in the production of the synthesized speech].

2. Description of the Related Art

Generally, the function of [the] *a* speech synthesizer is to provide different forms of information [for a man using a] computer *user*. To this end, the speech synthesizer should [serve the] *provide the* user with synthesized speech with high quality from a given text. [In addition, for the interlock with database produced in multimedia environment such as moving picture or animation, or a variety of media provided from a counterpart of conversion] *Preferably*, the speech synthesizer should *also* produce [the] synthesized speech to be synchronized with [theses media] *video data such as a moving picture, animation and so on*. [Particularly] *In particular*, the synchronization *function* of TTS [with] *in the* multimedia *environment* is essential to provide the user with *high quality* service [with high quality].

As shown in FIG. 1, typically, a conventional TTS goes through the process consisting of 3 steps as follows until the synthesized speech is produced from on inputted text.

In a first step, a language processor 1 converts the text into a series of phoneme, presumes prosody information and symbolizes this information. Symbol of prosody information is presumed from a boundary of the phrase and paragraph, a location of accent in word, a sentence pattern, and so on using the analysis result of syntax.

In a second step, a prosody processor 2 calculates a value of prosody control parameter from the symbolized prosody information using a rule and a table. Prosody control parameter includes duration of phoneme, pitch contour, energy contour, and pause interval information.

In a third step, a signal processor 3 produces a synthesized speech using a synthesis unit database 4 and the prosody control parameter. In other words, this means that the conventional TTS should presume the information associated with the natural speech rate in the language processor 1 and the prosody processor 2 only by the inputted text.

Further, the conventional TTS has simple function to output data inputted by the unit of sentence as the synthesized speech. Accordingly, in order to output sentences stored in a file or sentences inputted through a communication network as the synthesized speech in succession, a main control program which reads sentences from the inputted data and transmits them to an input of TTS is required. Such a main control program includes a method to separate the text from the inputted data and then output the synthesized speech once from the beginning to the end, a method to produce the synthesized speech in interlock with a text editor, a method to look up the sentences by use of a graphic interface and produce the synthesized speech, and so on, but the object to which these methods are applicable is restricted to the text.

At present, studies on TTS have considerably advanced for the vernacular language in different countries and a commercial use has been accomplished in some countries. However, this is in situation of the only use for the syntheses of speech from the inputted text. In addition, by a prior organization, since it is impossible to presume from only the text the information required when moving picture is to be dubbed by use of TTS or when the natural interlock between the synthesized speech and multimedia such as animation is to be implemented, there is no method to realize these functions. Furthermore, there is also no result of the studies on use of additional data for enhancement of the natural in the synthesized speech and organization of these data.

SUMMARY OF THE INVENTION

Therefore, it is an object of the present invention to provide a [text-to-speech conversion system (] TTS[)] for [interlocking with multimedia] *synchronizing synthesized speech with a moving picture* and a method [for organizing input data of the same] *therefore* for enhancing the [natural] *naturalness* of synthesized speech and [accomplishing synchronization of] *synchronizing* multimedia with TTS by defining additional prosody information, the information required to [interlock] *synchronize* TTS with multimedia, and *an* interface between [these] *such* information and TTS for use in [the production of the] *producing* synthesized speech.

In order to accomplish the above object, a TTS for interlocking with multimedia according to the present invention comprises a multimedia information input unit for organizing text, prosody, the information on synchronization with moving picture, lip-shape, and the information such as individual property; a data distributor by each media for distributing the information of the multimedia information input unit into the information by each media; a language processor for converting the text distributed by the data distributor by each media into phoneme stream, presuming prosody information and symbolizing the information; a prosody processor for calculating a value of prosody control parameter from the symbolized prosody information using a rule and a table; a synchronization adjuster for adjusting the duration of the phoneme using the synchronization information distributed by the data distributor by each media; a signal processor for producing a synthesized speech using the prosody control parameter and data in a synthesis unit database; and a picture output apparatus for outputting the picture information distributed by the data distributor by each media onto a screen.

In order to accomplish the above object, a method for organizing input data of a text-to-speech conversion system (TTS) for interlocking with multimedia comprises the steps of: classifying multimedia input information organized for enhancing the natural of synthesized speech and implementing the synchronization of multimedia with TIS into text, prosody, the information on synchronization with moving picture, lip-shape, and individual property information in a multimedia information input unit; distributing the information classified in the multimedia information input in a data distributor by each media, based on respective information; converting text distributed in the data distributor by each media into phoneme stream, presuming prosody information and symbolizing the information in a language processor; calculating a value of prosody control parameter other than prosody control parameter included in multimedia information in a prosody processor; adjusting the duration every each phoneme in a synchronization adjuster so that processing result in the prosody processor may be synchronized with a picture signal according to input of the synchronization information; producing the synchronized speech in a signal processor using the prosody information from the data distributor by each media, the processing result in the synchronization adjuster, and a synthesis unit database; and outputting the picture information distributed by the data distributor by each media onto a screen in a picture output apparatus.

BRIEF DESCRIPTION OF THE DRAWINGS

The foregoing and other objects, features, aspects of the present invention will become more apparent from the following detailed description of the present invention when taken in conjunction with the accompanying drawings.

DETAILED DESCRIPTION OF THE PREFERRED EMBODIMENT

Now, the present invention will be described in detail by way of the preferred embodiment.

Figure 1:
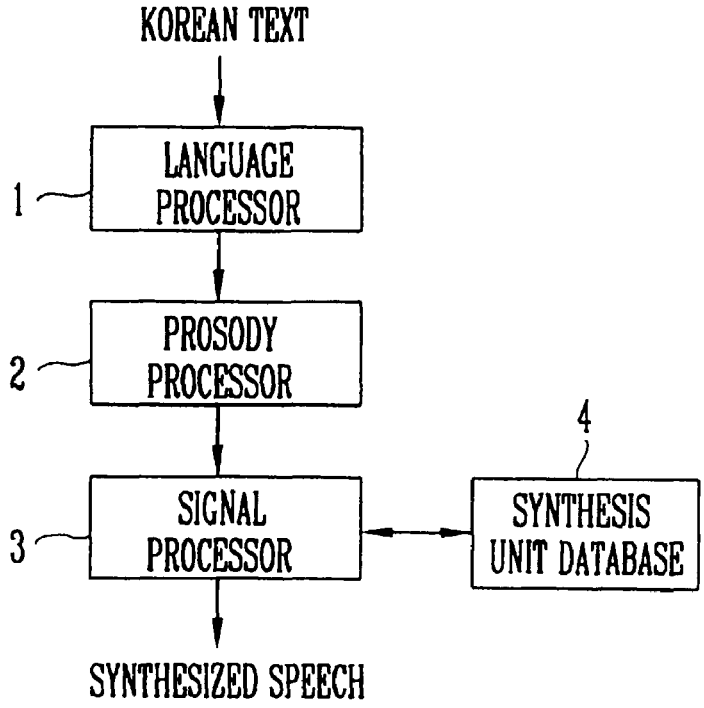
FIG. 1 is a constructional view of a conventional text-to-speech conversion system.
Figure 2:
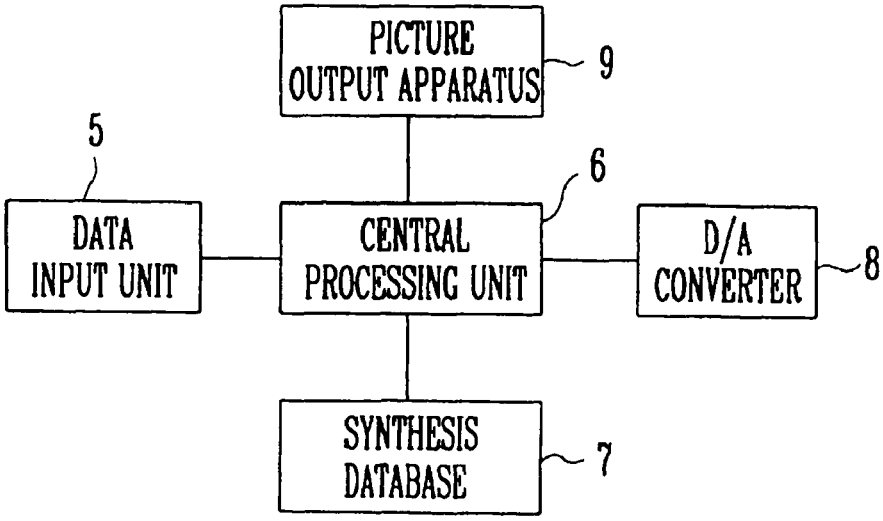
FIG. 2 is a constructional view of a hardware to which the present invention is applied.

Referring to FIG. 2, a constructional view of hardware to which the present invention is applied is shown. In FIG. 2, the hardware consists of a multimedia data input unit 5, a central processing unit 6, a synthesis database 7, a digital to analog (D/A) converter 8, and a picture output apparatus 9.

The multimedia data input unit 5 is inputted with data composed of multimedia such as picture and text and outputs this data to the central processing unit 6.

The central processing unit 6 distributes the multimedia data input of the present invention, adjusts synchronization, and performs algorithm based therein to produce synthesized speech.

The synthesis database 7 is a database used in the algorithm for producing the synthesized speech. This synthesis database 7 is stored in a storage device and transmits necessary data to the central processing unit 6.

The digital to analog (D/A) converter 8 converts the synthesized digital data into analog signal and outputs the analog signal.

The picture output apparatus 9 outputs inputted picture information onto a screen.

Table 1 and 2 are algorithms illustrating the state of organized multimedia input information, which consists of text, prosody, the information on synchronization with moving picture, lip-shape, and individual property information.

TABLE 1

| Syntax |
|---|
| TTS_Sequence( ) { |
| TTS_Sequence_Start_Code |
| TTS_Sentence_ID |
| Language_Code |
| Prosody_Enable |
| Video_Enable |
| Lip_Shape_Enable |
| Trick_Mode_Enable |
| do{ |
| TTS_Sentence ( ) |
| }while (next_bits( )==TTS_Sentence_Start_Code |
| } |

Here, the TTS_Sequence_Start_Code is a bit string represented with Hexadecimal 'XXXXX' and means a start of TTS sentence.

The TTS_Sentence_ID is a 10-bit ID [and] *which* represents a [proper] *unique identifying* number [of] *for* each TTS data stream.

The language_Code represents an object language such as Korean language, English language, German language, Japanese language, French language etc,. to be synthesize.

The prosody_Enable is a 1-bit flag and has a value of '1' when a prosody data of original sound is included in an organized data.

The Video_Enable is a 1-bit flag and has a value of '1' when a TTS is interlocked with moving picture.

The Lip _Shape_Enable is a 1-bit flag and has a value of '1' when a lip_shape data is included in an organized data.

The Trick_Mode_Enable is a 1-bit flag and has a value of '1' when a data is organized to support a trick mode such as stop, restart, forward and backward.

TABLE 2

| Syntax |
|---|
| TTS_Sentence ( ) { |
| TTS_Sentence_Start_Code |
| TTS_Sentence_ID |
| Silence |
| if (Silence) { |
| Silence_Duration |
| } |
| else { |
| Gender |
| Age |
| if(!Video_Enable) { |
| Speech_Rate |
| } |
| Length_of_Text |
| TTS_Text( ) |
| if(Prosody_Enable) { |
| Dur_Enable |
| FO_Contour_Enable |
| Energy_Contour_Enable |
| Number_of_Phonemes |
| for(j=0 ; j<Number_of_phonemes ; j++) { |
| Symbol_each_phoneme |
| if(Dur_Enable) { |
| Dur_each_phoneme |
| } |
| if(FO_Contour_Enable { |
| FO_contour_each_phoneme |
| } |
| if(Energy_Contour_Enable) { |
| Energy_contour_each_phoneme |
| } |
| } |
| } |
| if(Video_Enable) { |
| Sentence_Duration |

TABLE 2-continued

| Syntax |
|---|
| Position_in_Sentence<br>offset<br>}<br>if(Lip_Shape_Enable) {<br>Number_of_Lip_Event<br>for(j=0 , j<Number_of_Lip_Event ; j++) {<br>Lip_in_Sentence<br>Lip_Shape<br>}<br>}<br>}<br>} |

Here, the TTS_Sentence_Start_Code is a bit string represented [with] *by* Hexadecimal 'XXXXX' and [means] *indicates* a start of *a* TTS sentence. [And the] TTS_Sentence_Start_Code is a 10-bit ID and represents a [proper number of] *unique identifier for* each TTS data stream.

[The] TTS_Sentence_ID is a 10-bit ID and represents [a proper number] *a unique identifier* of each TTS sentence [existed] *present* in the TTS *data* stream.

[The] Silence [become a] *is a one-bit flag which is set to* '1' when a present input frame [of 1-bit flag] is [silence] *a silent* speech section.

[At stage of the] Silence_Duration[, a] *represents the* duration time of *a* present [silence] *silent* speech section [is represented by] *in* milliseconds.

[At stage of the] Gender[,] *indicates the desired* gender [is distinguished from a] *of the* synthesized speech.

[At stage of the] Age[, an] *indicates a desired apparent* age of the synthesized speech [distinguished into a] *categorized by* baby, youth, middle age [and] *or* old age *speech quality*.

[The] Speech_Rate represents a *desired output* speech rate of *the* synthesized speech.

[At stage of the] Length_of_Text, [a] *represents the* length of *an* input text sentence [is represented by] *as a* byte.

[At stage of the] TTS_Text[,] *represents an optional length of a* sentence text [having optional length is represented].

[The] Dur_Enable is a 1-bit flag [and become a] *set to* '1' when [a] duration time information is included in [an] *the* organized data *stream*.

[The] FO_Contour_Enable is a 1-bit flag [and become a] *set to* '1' when [a] pitch information of each phoneme is included in the organized data *stream*.

[The] Energy_Contour_Enable is a 1-bit flag [and become a] *set to* '1' when [an] energy information of each phoneme is included in the organized data *stream*.

[At stage of the] Number_of_Phonemes[,] *represents* the number of [phoneme needed] *phonemes required* to synthesize a sentence [are represented].

[At stage of the] Symbol_each_phoneme[,] *represents a* symbol, such as IPA, which is to represent each phoneme [is represented].

[The] Dur_each_phoneme represents a duration time of *each* phoneme.

[At stage of the] FO_contour_each_phoneme[,] *represents* a pitch pattern of the phoneme represented by a pitch value of *a* beginning point, *a* mid point and *an* end point of the phoneme [is represented].

[At stage of the] Energy_Contour_each_phoneme[,] *represents an* energy pattern of the phoneme [is represented] and an energy value of *a* beginning point, *a* mid point and *an* end point of the phoneme [is represented by decibel] *in decibels* (dB).

[The] Sentence_Duration represents a total duration time of *the* synthesized speech of the sentence.

[The] Position_in_Sentence represents a position of *a* present frame in the sentence.

[At stage of the offset,] *Offset represents a delay time* when the synthesized speech is [interlocked] *synchronized* with *a* moving picture, and a beginning point of the sentence is in the GOP (Group Of Pictures)[, a] *The* delay time [consumed] *identifies the time* from *the* beginning point of *the* GOP to *the* beginning point of the sentence [is represented].

The Number_of_Lip_Event represents the number of changing point of lip-shape in the sentence.

*Lip_in_Sentence represents the location of a lip_shape changing part in a sentence.*

The Lip_shape represents a lip—shape at lip—shape changing point of the sentence.

Text information includes a classification code for a used language and a sentence text. Prosody information includes the number of phoneme in the sentence, phoneme stream information, the duration of every each phoneme, pitch pattern of phoneme, energy pattern of phoneme, and is used for enhancing the natural of the synthesized speech. The synchronization information of the moving picture with the synthesized speech can be considered as the dubbing concept and the synchronization could be realized in three ways.

Firstly, there is a method to synchronize between the moving picture and the synthesized speech by the sentence unit by which method the duration of the synthesized speech is adjusted using the information about the beginning points of sentences, the durations of sentences, and the delay times of the beginning points of sentences. The beginning points of each sentence indicates the locations of scenes from which output of the synthesized speech for each sentence within the moving picture is started. The durations of sentences indicate the number of scenes in which the synthesized speech for each sentence lasts. In addition, the moving picture of MPEG-2 and MPEG-4 picture compression type in which Group of Picture (GOP) concept is used should start at not any scene but a beginning scene within Group of Picture for reproduction. Therefore, the delay time of the beginning point is the information required to synchronize between the Group of Picture and the TTS and indicates delay time between the beginning scene and a speech beginning point. This method is easy to be realized and can minimize additional effort but is difficult to accomplish natural synchronization by this method.

[Secondly, there is a method by which] *The second method produces synthesized speech on a phoneme basis by use of* beginning point information[,] *and* end point information[, and phoneme information are] marked [every] *for* each phoneme within [an interval] *period* associated with *a* speech signal in the moving picture [and these information is used to produce the synthesized speech]. This method has an advantage *in* that *the* degree of accuracy is high since the synchronization between the moving picture and the synthesized speech by the phoneme unit can be [attained but] *realized. However, this method also has* a disadvantage *in* that additional effort [should be fairly] *must be* made to detect and record the duration information [by] *of* the phoneme unit within the speech interval of the moving picture.

[Thirdly, there is a method to record] *The third method records* the synchronization information based on the beginning point of speech, the end point of speech, lip-shape, *information,* and a *change* point [of time] *information* of lip-shape [change]. Lip-shape [is numeralized] *information quantifies the* to distance (extent of opening) between *the* upper lip and *the* lower lip, *the* distance (extent of width)

between left and right and points of *the* lip, and *the* extent of [projecting] of *the* lip and is defined as a quantized and normalized pattern [depended on] *dependent upon* articulation location and articulation manner of *the* phoneme using a [on the basis of pattern with high discriminative property] *highly discriminating pattern*. This method [is a method to raise] *improves the* efficiency of synchronization, while *minimizing* additional effort to produce the *synchronization* information [for synchronization can be minimized].

[The organized] *Organizing* multimedia input information [which is applied to] *in accordance with* the present invention allows an information provider to [select and] implement [optionally among 3] *any of the three* synchronization methods [as] described above.

In addition, the organized multimedia input information is also used in the process to implement lip animation. Lip animation can be implemented by using phoneme stream prepared from the inputted text in the TTS and the duration every each phoneme, or phoneme stream distributed from the input information and the duration every each phoneme, or by using the information on lip-shape included in the inputted information.

The individual property information allows the user to change gender, age, and speech rate of the synthesized speech. Gender has male and female, and age is classified into 4, for example, 6-7 years, 18 years, 40 years, and 65 years. The change of speech rate may have 10 steps between 0.7 and 1.6 times of a standard rate. Quality of the synthesized speech can be diversified using these information.

Figure 3:
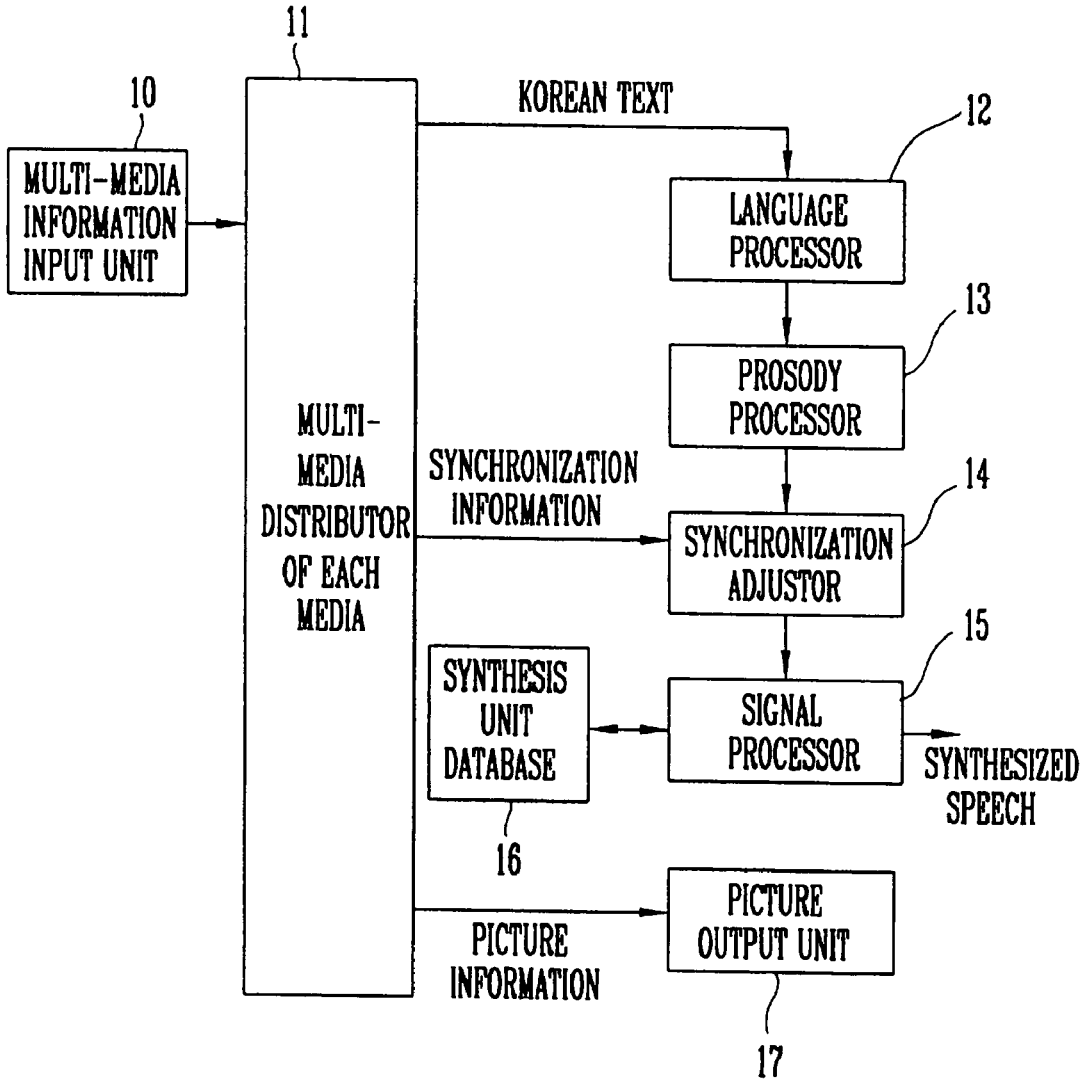
FIG. 3 is a constructional view of a text-to-speech conversion system according to the present invention.

FIG. 3 is a constructional view of the text-to-speech conversion system (TTS) according to the present invention. In FIG. 3, the TTS consists of a multimedia information input unit 10, a data distributor by each media 11, a standardized language processor 12, a prosody processor 13, a synchronization adjuster 14, a signal processor 15, a synthesis unit database 16, and a picture output apparatus 17.

The multimedia input unit 10 is configured as form of Table 1 and 2 and comprises *text*, prosody *information*, the *information* on synchronization with moving *picture*, the information on *lip-shape*. A*mong these*, *requisite* information *is text*, other information can be optionally provided by *an* information provider as optional item for enhancing the *individual* property and the natural *and* accomplishing the *synchronization* with the *multimedia*, and if *needed*, can be *amended* by a TTS user by means of a character input device (*keyboard*) or a *mouse*. T*hese* information is transmitted to *the* data distributor by each media 11.

The data distributor by each media 11 receives the multimedia information of which the picture information is transmitted to the picture output apparatus 17, text is transmitted to the language processor 12, and the synchronization information is converted into data structure capable of utilizing in the synchronization adjuster 14 and transmitted to the synchronization adjustor 14. If prosody information is included in the inputted multimedia information, this multimedia information is converted into a data structure capable of utilizing in the signal processor 15 and then transmitted to the prosody processor 13 and the synchronization adjustor 14. If individual property information is included in the inputted multimedia information, this multimedia information is converted into data structure capable of utilizing in the synthesis unit database 16 and the prosody processor 13 within the TTS and then transmitted to the synthesis unit database 16 and the prosody processor 13.

The language processor 12 converts text into phoneme stream, presumes prosody information, symbolizes this information, and then transmits the symbolized information to the prosody processor 13. The symbol of prosody information is presumed from a boundary of the phrase and paragraph, a location of accent in word, a sentence pattern, and so on using the analysis result syntax.

The prosody processor 13 takes the processing result of the language processor 12 and calculates value of prosody control parameter other than prosody control parameter included in the multimedia information. Prosody control parameter includes duration pitch contour, energy contour, pause point, and pause length of phoneme. The calculated result is transmitted to thesynchronization adjustor 14.

The synchronization adjustor 14 takes the processing result of the prosody processor 13 and adjusts the duration every each phoneme in orderto synchronize the result with the picture signal. The adjustment of the duration every each phoneme utilizes the synchronization information transmitted from the data distributor by each media 11. First, lip-shape is assigned to each phoneme depended on articulation location and articulation manner of each phoneme and, on the basis of this, the assigned lip-shape information is compared to lip-shape information included in the synchronization information and then phoneme stream is divided into small groups by the number of lip-shape recorded in the synchronization information. Also, the duration of phoneme in the small groups is calculated again using the duration information of lip-shape included in the synchronization information. The adjusted duration information is transmitted to the signal processor, included in the processing result of the prosody processor.

The signal processor 15 receivesthe prosody information from the multimedia distributor 11 or the processing result of the synchronization adjustor 14 to produce and output the synthesized speech using the synthesis unit database 16.

The synthesis unit database 16 receives the individual property information from the multimedia distributor 11, selects synthesis units adaptable to gender and age, and then transmits data required for synthesis to the signal processor 15 in response to a request from the signal processor 15.

As can be seen from the description described above, according to the present invention, the individual property of the synthesized speech can be realized and the natural of the synthesized speech can be enhanced by organizing the individual property and prosody information presumed by the analysis of actual speech data, along with text information, as multistage information. Furthermore, a foreign movie can be dubbed in Korean by implementing the synchronization of the synthesized speech with the moving picture by way of the direct use of text information and lip-shape information which is presumed by the analysis of actual speech data and lip-shape in the moving picture for the production of the synthesized speech. Still furthermore, the present invention is applicable to a variety of field such as communication service, office automation, education and so on by making the synchronization between the picture information and the TTS in the multimedia environment possible.

Although the present invention and its advantages have been described in detail, it should be understood that various changes, substitutions and alterations can be made herein without departing from the spirit and scope of the invention as defined by the appended claims.

It is therefore intended by the appended claims to cover any and all such applications, modifications, and embodiments within the scope of the present invention.

What is claimed is:

1. A text-to-speech conversion system for interlocking with multimedia comprising;

a multimedia information input unit for organizing text, prosody information, information on synchronization with a moving picture, lip-shape information, picture information, and individual property information including a gender, age, accent, pronunciation and speech rate of synthesized speech;

a data distributor for distributing the information from said multimedia information input unit into information for each media;

a language processor for converting the text distributed by said data distributor into a phoneme stream, presuming prosody information and symbolizing the presumed prosody information;

a prosody processor for calculating a prosody control parameter value from the symbolized prosody information from the language processor;

a synchronization adjuster for adjusting a duration of each phoneme using the synchronization information distributed by said data distributor;

a synthesis unit database for receiving the individual property information from said data distributor, selecting synthesis units adaptable to gender and age and outputting data required for synthesis;

a signal processor for producing a synthesized speech using the prosody control parameter and the data output from said synthesis unit database; and a picture output apparatus for outputting the picture information distributed by said data distributor onto a screen.

2. A method for organizing input data of a text-to-speech conversion system for interlocking with multimedia, said method comprising the steps of:

(a) classifying multimedia input information organized for enhancing natural synthesized speech and implementing synchronization of multimedia with text-to-speech into text, prosody information, information on synchronization with a moving picture, lip-shaped information, picture information, and individual property information using a multimedia information input unit;

(b) distributing using a data distributor the multimedia input information classified in the multimedia information input unit based on respective information;

(c) converting the text distributed by the data distributor into a phoneme stream, presuming prosody information and symbolizing the presumed prosody information using a language processor;

(d) calculating a prosody control parameter value which is not included in the multimedia input information using a prosody processor;

(e) adjusting a duration of each phoneme using a synchronization adjuster so as to synchronize a processing result of the prosody processor with a picture signal according to the synchronization information distributed by the data distributor;

(f) selecting synthesis units adaptable to gender and age based on the individual property information from the data distributor using a synthesis unit database and outputting data required for synthesis;

(g) producing synthesized speech using a signal processor based on the prosody information distributed by the data distributor, a processing result of the synchronization adjuster, and the data from the synthesis unit database; and (h) outputting the picture information distributed by the data distributor onto a screen using a picture output unit.

3. The method in accordance with claim 2, wherein the organized multimedia information comprises text information, prosody information, information on synchronization with a moving picture, lip-shaped information, and individual property information.

4. The method in accordance with claim 3, wherein the prosody information comprises a number of phoneme, phoneme stream information, duration of each phoneme, pitch pattern of the phoneme, and energy pattern of the phoneme.

5. The method in accordance with claim 4, wherein the duration time of the phoneme is indicative of a value of pitch at a beginning point, a mid point, and an end point within the phoneme.

6. The method in accordance with claim 5, wherein the energy pattern of the phoneme is indicative of a value of energy in decibels at the beginning point, the mid point, and the end point within the phoneme.

7. The method in accordance with claim 3, wherein the synchronization information comprises text, lip-shape, location information with a moving picture, and duration information.

8. The method in accordance with claim 3, wherein the synchronization information comprises a beginning point, duration and delay time information of a starting point, and duration of each phoneme is controlled by the synchronization information.

9. The method in accordance with claim 3, wherein the synchronization information is composed of a duration of a beginning point of a sentence, a duration information of a starting point, and duration of each phoneme is controlled by forecast lip-shape considered an articulation manner of the phoneme and articulation control of lip-shape within the synchronization and duration information of the synchronization information.

10. The method in accordance with claim 3, wherein the synthesized speech is produced based on beginning point information, end point information, and phoneme information for each phoneme within an interval associated with a speech signal.

11. The method in accordance with claim 3, wherein the synthesized speech is produced based on a distance of an opening between an upper lip and a lower lip, a distance between end points of the lips, and an extent of projection of a lip, and a lip-shape quantized and normalized pattern is defined depending on articulation location and articulation manner of the phoneme on a basis of pattern with discriminative property.

12. The method in accordance with claim 3, wherein if the multimedia input information comprises prosody information, further comprising the steps of:

(i) converting the prosody information into a data structure recognizable by the signal processor; and (j) transmitting the converted prosody information *to* the prosody processor [and the synchronization adjustor].

13. The method in accordance with claim 3, wherein if the multimedia input information includes individual property information, further comprising the steps of:

(k) converting the individual property information into a data structure recognizable by the synthesis unit database and the prosody processor within the text-to-speech;

(l) transmitting the converted individual property information to the synthesis unit database [and the prosody processor].

*14. A text-to-speech conversion system (TTS) for synchronizing synthesized speech and a moving picture which is to be displayed on a picture output apparatus which is connected with the TTS, the TTS including a language processor for converting the text into phoneme stream and presuming*

*prosody information from the phoneme stream; a prosody processor for calculating prosody control parameter values from the prosody information using a predefined rule; and a signal processor for producing synthesized speech using the prosody control parameter values and synthetic data stored in a synthesis unit database, characterized in that the TTS comprises:*

*a multimedia information input unit for inputting a set of multimedia information, the set of multimedia information including moving picture information, text information, and synchronization information;*

*a data distributor for classifying the set of multimedia information into a plurality of subsets of the multimedia information to distribute each subset of the multimedia information into a corresponding one of the language processor, prosody processor, signal processor and the picture output apparatus; and*

*a synchronization adjuster for adjusting the duration of each phoneme in the phoneme stream using the synchronization information subset distributed by said data distributor to synchronize between synthesized speech to be produced by the signal processor and the moving picture to be displayed on the picture output apparatus.*

*15. A method for synchronizing synthesized speech generated from a TTS and a moving picture which is to be displayed on a picture output apparatus which is connected with the TTS, the method comprising the steps of:*

*receiving a set of multimedia information which includes text information, moving picture information and synchronization information;*

*classifying the set of the received multimedia information into a plurality of subsets of the information including a synchronization information subset;*

*converting each classified text information subset into a phoneme stream;*

*presuming prosody information from each phoneme stream;*

*calculating prosody control parameter values based on the prosody information;*

*adjusting the duration of each phoneme of each phoneme stream using the respective classified synchronization information subset to synchronize between the synthesized speech and the moving picture; and*

*producing the synthesized speech using the prosody control parameter values and data in a synthesis unit database, in synchronism with the moving picture to be displayed.*

*16. The method according the claim 15, wherein said prosody control parameters are comprised of the number of phonemes, duration time of each phoneme, pitch pattern of each phoneme and energy pattern of each phoneme.*

*17. The method according to claim 16, wherein said pitch pattern of each phoneme is indicative of a value of pitch of the desired synthesized speech at a beginning point, a middle point, and an end point within each phoneme.*

*18. The method according to claim 16, wherein said energy pattern of each phoneme is indicative of a value of energy of the desired synthesized speech in decibels at a beginning point, a mid point and an end point within each phoneme.*

*19. The system according to claim 14, wherein said synchronization information subset includes lip-shape information, said lip-shape information including a number of lip-shape change points, a location of lip-shape change points in a sentence and a lip-shape representation at every lip-shape change point.*

*20. The system according to claim 14, wherein a set of said multimedia information further includes individual property information, said individual property information subset including gender and age information of the synthesized speech.*

*21. The system according to claim 14, wherein if a set of said multimedia information further includes prosody control parameters, said prosody control parameters are capable of being utilized in said synchronization adjuster without the processing of said language processor and prosody processor.*

*22. The system according the claim 21, wherein said prosody control parameters include the number of phonemes in the data stream, a duration time of each phoneme, a pitch pattern of each phoneme and an energy pattern of each phoneme.*

*23. The system according to claim 22, wherein said pitch pattern of each phoneme is indicative of a value of pitch of the desired synthesized speech at a beginning point, a middle point, and an end point within each phoneme.*

*24. The system according to claim 22, wherein said energy pattern of each phoneme is indicative of a value of energy of the desired synthesized speech in decibels at a beginning point, a mid point and an end point within each phoneme.*

*25. The method of claim 15, wherein the classified synchronization information subset includes lip-shape information, said lip-shape information including a number of lip-shape change points, a location of lip-shape change points in a sentence and a lip-shape representation at every lip-shape change point.*

*26. The method according to claim 15, wherein said set of the received multimedia information further includes an individual property information subset, said individual property information subset including gender and age information of the synthesized speech.*

*27. A method for synchronizing synthesized speech generated from a TTS and a moving picture which is to be displayed on a picture output apparatus which is connected with the TTS, the method comprising the steps of:*

*receiving a set of multimedia information which includes text information, moving picture information, synchronization information and prosody control parameters, said prosody control parameters including a duration of each phoneme;*

*classifying a set of the received multimedia information into a plurality of subsets of the information including a synchronization information subset;*

*adjusting the duration of each phoneme using the classified synchronization information subset to synchronize between the synthesized speech and the moving picture; and*

*producing the synthesized speech using the prosody control parameter values included in a set of the received multimedia information and data in a synthesis unit database, in synchronism with the moving picture to be displayed onto screen in the picture output apparatus.*

*28. A process for producing synthesized speech in synchronism with an associated moving picture characterized in that the process comprises receiving a set of multimedia information including text information, moving picture information and synchronization information; and synthesizing speech from the received text information in synchronization with the received moving picture information using the received synchronization information.*

*29. A speech synthesizer for use in synchronizing synthesized speech generated from a TTS and a moving picture which is to be displayed on a picture output apparatus which is connected with the TTS, the speech synthesizer comprising:*

*means for receiving prosody control parameters including a duration of each phoneme, synchronization information and moving picture data;*

*means for adjusting the duration of each phoneme of each phoneme stream using the synchronization information to synchronize between the synthesized speech and the moving picture; and*

*means for producing the synthesized speech using the prosody control parameter values and data in a synthesis unit database, in synchronism with the moving picture to be displayed.*

*30. A synthesizer for producing a synthesized speech using a text information, comprising:*

*receiving means for receiving the text information usable for synthesizing speech, and synchronization information including a number of lip-shape change points and a lip-shape representation at every lip-shape change point;*

*synthesizing means, for producing the synthesized speech from the text information using the synchronization information; and*

*outputting means for outputting the synthesized speech.*

*31. The synthesizer according to claim 30, wherein a picture output apparatus is connected to the synthesizer and operated in synchronization with the synthesizer.*

*32. The synthesizer according to claim 31, wherein the synchronization information is related to a moving picture outputted from the picture output apparatus.*

* * * * *